(12) United States Patent
Hibon et al.

(10) Patent No.: US 6,190,160 B1
(45) Date of Patent: Feb. 20, 2001

(54) PROCESS FOR COMBUSTION OF A FUEL WITH AN OXYGEN-RICH OXIDANT

(75) Inventors: Isabelle Hibon, Le Chesnay; Jean-Francois Simon, Vincennes, both of (FR)

(73) Assignee: L'Air Liquide, Societe Anonyme pour pour l'Etude et l'Exploitation des Procedes Georges Claude, Paris (FR)

( * ) Notice: Under 35 U.S.C. 154(b), the term of this patent shall be extended for 0 days.

(21) Appl. No.: 09/347,026

(22) Filed: Jul. 2, 1999

(30) Foreign Application Priority Data

Jul. 8, 1998 (FR) .................................................. 98-08742

(51) Int. Cl.[7] ...................................................... F23N 1/02
(52) U.S. Cl. .................. 431/12; 431/10; 431/37; 431/76; 431/90; 110/188; 110/186
(58) Field of Search .................. 431/12, 18, 37, 431/89, 90, 75, 76, 10, 2; 110/185, 186, 188, 190

(56) References Cited

U.S. PATENT DOCUMENTS

| | | | |
|---|---|---|---|
| 4,547,150 | * 10/1985 | Vereecke | 431/12 |
| 4,861,262 | 8/1989 | Gitman et al. | 431/12 |
| 5,205,486 | * 4/1993 | Jung | 431/14 |
| 5,425,316 | * 6/1995 | Malone | 110/190 |
| 5,520,123 | * 5/1996 | Chapell et al. | 110/188 |
| 5,762,008 | 6/1998 | Martin et al. | 110/345 |
| 5,971,747 | * 10/1999 | Lemelson et al. | 431/12 |

FOREIGN PATENT DOCUMENTS 4336174    4/1995 (DE) .

OTHER PUBLICATIONS

Patent Abstracts of Japan, vol. 14, No. 450, (M–1030), Sep. 27, 1990—JP 02 178513.
Patent Abstracts of Japan, vol. 11, No. 135, (M–585), Apr. 28,1987—JP 02 178513.
Patent Abstracts of Japan, vol. 15, No. 264, (M–1132), Apr. 12,1 991—JP 03 087513.

* cited by examiner

Primary Examiner—Ira S. Lazarus
Assistant Examiner—Josiah C. Cocus
(74) Attorney, Agent, or Firm—Burns, Doane, Swecker & Mathis, LLP

(57) ABSTRACT

The invention relates to a process for combustion of a fuel with an oxygen-rich oxidant, in a combustion chamber (3), in which, cyclically: at least one principal variable representing the combustion in the said combustion chamber (3) is measured, and, as a function of the result of the measurement of the at least one principal variable, a control instruction for regulating the flowrates of fuel and oxidant to be injected into the combustion chamber (3) is determined. Then the regulating control instruction is applied in order to make the fuel burn with the oxidant in the chamber (3). Additionally at least one secondary variable associated with an operational constraint of the combustion chamber (3) or with a perturbation in the operation of the latter is measured, and for the determination of regulating control instruction, the measurement result of the at least one secondary variable is also taken into account. The invention is useful in glass furnaces, rotary furnaces, and incineration furnaces.

8 Claims, 2 Drawing Sheets

PROCESS FOR COMBUSTION OF A FUEL WITH AN OXYGEN-RICH OXIDANT

This application claims priority under 35 U.S.C. §§119 and/or 365 to 98 08742 filed in France on Jul. 8. 1998; the entire content of which is hereby incorporated by reference.

BACKGROUND OF THE INVENTION

1. Field of the Invention

The invention relates to a process for combustion of a fuel with an oxidant whose oxygen level is more than 25 mol %, in a combustion chamber, in which, cyclically:

- at least one principal variable representing the combustion in the said combustion chamber is measured,
- as a function of the result of the measurement of the said at least one principal variable, a control instruction for regulating the flowrates of fuel and oxidant to be injected into the said combustion chamber is determined, and
- the said regulating control instruction is applied in order to make the fuel burn with the oxidant in the said combustion chamber.

2. Description of the Related Art

A large number of industrial processes are based on the combustion of various fuels such as natural gas, propane, fuel oil, etc. Among these processes, mention may particularly be made of processes for incinerating waste or for melting glass in a furnace.

Conventionally, for carrying out the combustion processes in these furnaces, air is used as the oxidant. The situation is then referred to as "air combustion".

For glass furnaces, rotary furnaces or incineration furnaces operating with air as the oxidant, various processes for regulating the combustion are known. These are generally processes in which one or two variables connected directly with the combustion are measured, such as for example a roof temperature and/or the oxygen level of the outlet fumes of the furnace, and an empirical control taking the measurement results into account is applied in order to regulate the amounts of fuel and air injected into the furnace in order to sustain the combustion.

Recently, in order on the one hand to be able to comply with the constraints relating to new standards governing the emission, for example, of nitrogen oxides or carbon monoxide at the outlet of the furnace and, on the other hand, to increase the power of such furnaces, furnace operators are making increasing use, as the oxidant, of oxygen-enriched air or substantially pure oxygen (that is to say having an oxygen level higher than 90 mol %) instead of air. This situation is referred to as "oxy-combustion".

However, the inventors have has become aware that the conventional processes mentioned above cannot provide satisfactory regulation of oxy-combustion. Indeed, the more the oxygen level in the oxidant moves away from a 25 mol % oxygen level, that is to say the closer the situation comes to so-called "all oxygen" combustion (that is to say combustion using substantially pure oxygen as the oxidant), the more conventional regulation becomes unsatisfactory.

By way of explanators, the invention have observed that the regulation of oxy-combustion is more difficult than that of air combustion because of the appearance of new parameters which have a non negligible effect on the combustion.

Thus, for example, they have found that in the case of oxy-combustion, fluctuations of the oxygen level in the oxidant have a non negligible impact on the power of the combustion, that is to say the amount of heat released by the flame.

Furthermore, given that in the case of combustion with substantially pure oxygen, the volume of fumes is reduced by approximately a factor of five compared with the volume of fumes from air combustion, the inventiors have found that inadvertent intake of air into a furnace can greatly interfere with the oxy-combustion and increase the emission of nitrogen oxides.

In addition, the fact that the temperature of the flames of oxy-combustion is generally higher than those of the flames of air combustion can accelerate wear of the refractory lining material of the inner walls of the furnace, depending on the nature of the molten material.

The object of the invention is therefore to take these observations by the inventors into account in order to obtain more satisfactory regulation of the oxy-combustion in a furnace.

SUMMARY OF THE INVENTION

To that end, the invention relates to a process for combustion of a fuel with an oxidant whose oxygen level is more than 25 mol %, in a combustion chamber, in which, cyclically:

- at least one principal variable representing the combustion in the said combustion chamber is measured,
- as a function of the result of the measurement of the said at least one principal variable, a control instruction for regulating the flowrates of fuel and oxidant to be injected into the said combustion chamber is determined, and
- the said regulating control instruction is applied in order to make the fuel burn with the oxidant in the said chamber, characterized in that
- at least one secondary variable associated with an operational constraint of the said combustion chamber or with a perturbation in the operation of the latter is additionally measured, and
- for the determination of said regulating control instruction, the measurement result of the said at least one secondary variable is also taken into account.

The process according to the invention may also have one or more of the following characteristics:

- the said at least one variable associated with an operational constraint of the said chamber is a variable in the following group: the level of nitrogen oxides in the outlet fumes of the combustion chamber, the level of carbon monoxide in the outlet fumes of the combustion chamber and a wall temperature of the said combustion chamber,
- the said at least one variable associated with an operational perturbation of the said combustion chamber is a variable in the following group: the nitrogen level of the fuel, the oxygen level of the oxidant and the operational state of at least one burner of the said combustion chamber,
- a plurality of secondary variables associated with operational constraints of the said combustion chamber and/or with perturbations in the operation of the latter are measured and, for the determination of the said regulating control instruction, the measurement result of each secondary variable is taken into account,
- the regulating control instruction is determined by a fuzzy-logic controller employing the steps consisting in:
- converting each principal or secondary variable with a view to establishing its degree of membership in at least one state of a fuzzy variable, applying preestablished rules between at least one state of a first fuzzy variable and a state of a second fuzzy variable in order to determine a control instruction for regulating the flowrates of fuel and oxidant to be injected into the said combustion chamber, and applying the said regulating control instruction to make the fuel burn with the oxidant in the said chamber, the input fuzzy variables are established on the basis of curves defined throughout the universal set of the principal and secondary variables.

BRIEF DESCRIPTION OF THE FIGURES OF THE DRAWING

Other characteristics and advantages of the invention will become apparent from the following description, which is given by way of example and without implying any limitation, with reference to the appended drawings in which.

DETAILED DESCRIPTION OF THE PREFERRED EMBODIMENTS

Figure 1:
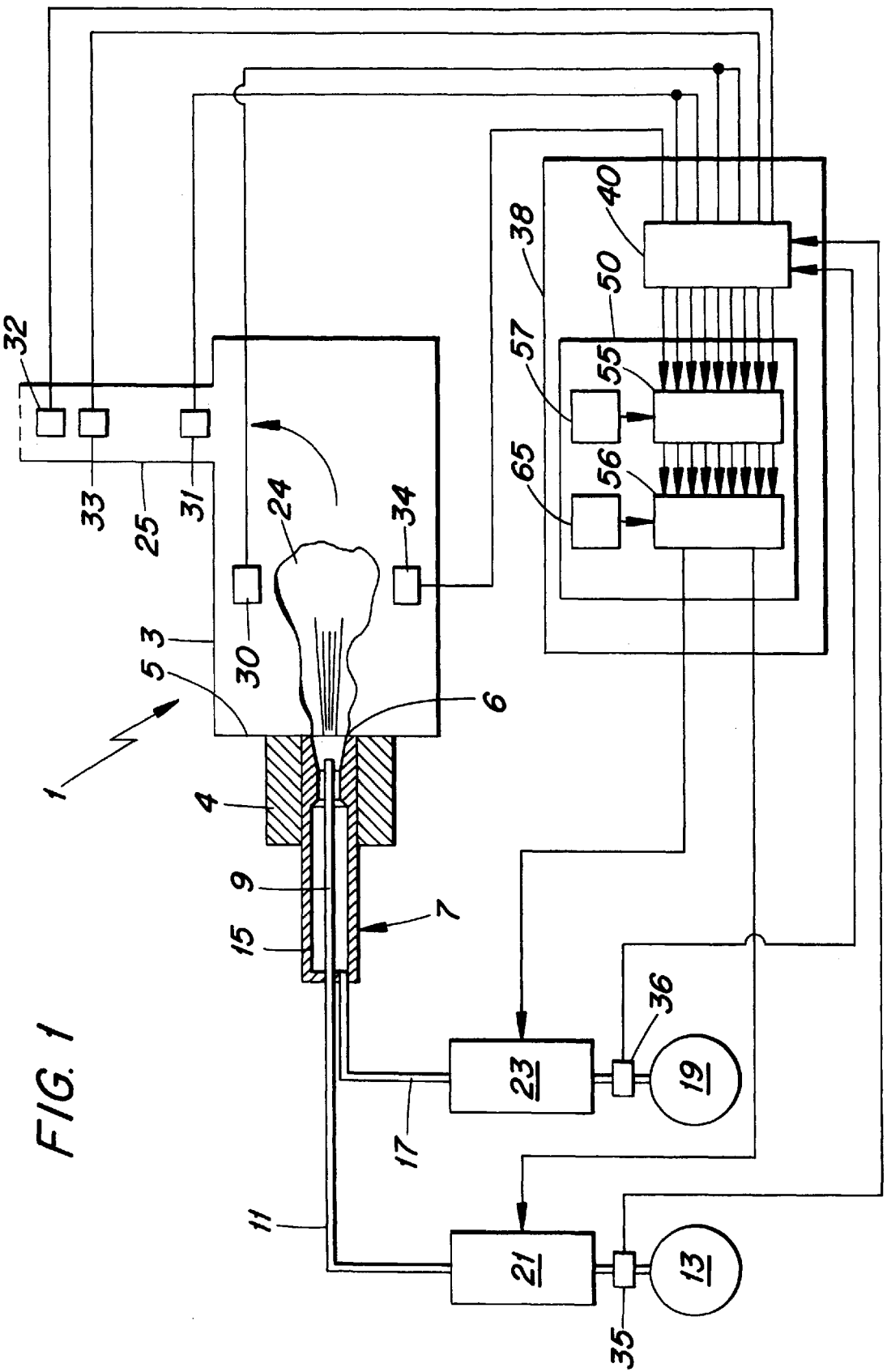
FIG. 1 is a schematic view of a furnace employing the process according to the invention.

1. Example of the Structure of a Furnace for Implementing the Process According to the Invention FIG. 1 schematically represents a furnace 1 such as a glass melting furnace or a waste incineration furnace. This furnace 1 comprises a combustion chamber 3 which has an opening 6 in a side wall 5. A block 4 of a refractory material, in which an "oxy-burner" 7, that is to say a burner accepting an oxidant whose oxygen level is higher than 25 mol %, or even substantially 100%, is fixed against the side wall 5 level with this opening 6.

The burner 7 comprises a central duct 9 connected via a feedline 11 to a source 13 of a fuel, such as for example natural gas, fuel oil, propane, etc., and a peripheral annular duct 15 connected via a feedline 17 to a source 19 of an oxidant whose oxygen level is higher than 25 mol %. This source may for example be formed by a simple pressurized tank containing oxygen-enriched air or substantially pure oxygen, a unit for enriching air with oxygen, or alternatively, and preferably, a unit for on-site oxygen production.

A flow meter 21 for regulating the flowrate of the fuel feeding the burner 7 is arranged in the line 11, and a flow meter 23 for regulating the flowrate of the oxidant is arranged in the line 17.

The fuel burns in the presence of the oxidant in a combustion zone 24 of the chamber 3.

The fumes produced by the combustion are discharged via an outlet duct 25.

The furnace also comprises various measuring sensors 30, 31, 32, 33, 34, 35 and 36, details of which will be given below. These sensors 30 to 36 are connected to a central processing unit 38 intended, on the one hand, to process the signals recorded by the various sensors 30 to 36 and, on the other hand, to determine a control instruction for the flow meters 21 and 23 and to apply this instruction in order to regulate the flowrates of fuel and oxidant to be injected into the said combustion chamber 3.

These various sensors include sensors 30 and 31 for measuring principal variables representative of the combustion in the said combustion chamber 3, and sensors 32 to 36 for secondary variables associated with an operational constraint of the combustion chamber 3 or with a perturbation in the operation of the latter.

The term "principal variables representative of the combustion in the said combustion chamber 3" is intended to mean variables for qualifying the combustion in terms of its foremost effect, that is to say the heating of the furnace. Such variables include, for example, the roof temperature measured by the sensor 30 or the oxygen level in the fumes at the outlet of the furnace, which is measured by the sensor 31.

The term "secondary variable associated with an operational constraint of the said chamber 3" is intended to mean, for example, variables or physical quantities subject to the regulatory standards of a country, such as for example the level of nitrogen oxides $NO_x$ or of carbon monoxide CO in the fumes at the outlet of the furnace, which are measured respectively by the sensors 32 and 33. This group of secondary variables also includes those for which, for example, the crossing of a certain threshold can damage or accelerate the wear of the structure of the furnace 1, such as for example a wall temperature of the furnace, which is measured by the sensor 34.

The term "secondary variable associated with a perturbation in the operation of the combustion chamber 3" is intended to mean variables or physical quantities which affect the combustion in the chamber 3 without being directly connected with the regulation of the flowrates of fuel and of oxidant by the flow meters 21 and 23, such as for example the level of nitrogen in the fuel, which is measured by the sensor 35, or the level of oxygen in the oxidant, which is measured by the sensor 36. Such a secondary variable may also represent an operational state of the burner 7 or, if the combustion chamber is equipped with a plurality of burners, the operational state of each burner in order to make it possible to cut the supply to a faulty burner.

All the signals which are recorded by the sensors 30 to 36 and each corresponding to values of the principal and secondary variables are introduced into the central processing unit 38, and more particularly into means 40 for processing the signals from the sensors 30 to 36.

In these means 40, the signals originating from the sensors 30 to 36 are processed conventionally, that is to say they are for example amplified, smoothed and digitized.

Furthermore, these means 40 may process the signals so as to determine other principal and secondary variables which are of interest in order to refine the regulation of the furnace 1.

The means 40 thus determine, for example, on the one hand a variable referred to as "$eO_2$" which represents the excursion of the oxygen level in the fumes at the outlet of the furnace, which is measured by the sensor 31, from a target value and, on the other hand, a variable referred to as "$dO_2$" which represents the variation per unit time of the oxygen level in the fumes at the outlet of the furnace.

The signals which are processed in this way and each correspond either to the value of a principal variable or the value of a secondary variable, are introduced into a fuzzy-logic controller 50 of the central processing unit 38. This fuzzy-logic controller 50 comprises means 55 for converting each of these principal and secondary variables with a view to establishing its degree of membership in at least one state of an associated fuzzy variable, and means 56 for applying rules stored in memory in order to determine a control instruction and to apply it to the flow meters 21 and 23.

The conversion which will be explained in more detail below is carried out on the basis of continuous curves which are defined throughout the universal set of the principal and secondary variables and are stored in a database 57 connected to the conversion means 55.

The rules for applying the fuzzy logic are determined empirically and are stored in a memory 65 forming a knowledge base.

Advantageously, the control unit 38 principally consists of a computer which has interfaces suitable for acquiring the signals from the sensors 30 to 36 and is loaded with programmes suitable for processing and utilizing these signals.

II. Operation of the Furnace and Implemention of the Process According to the Invention The way in which the furnace 1 operates will be explained below by setting out in detail, on the one hand, the various steps in the process according to the invention and, in particular, the implementation of the application of the rules to the fuzzy variables by the fuzzy-logic controller 50.

Of course, the process is applied cyclically, one cycle comprising the steps of measuring the principal and secondary variables, processing and converting them and determining and applying a control instruction.

II.1 Conversion of the Principal and Secondary Variables in Order to Establish Their Degrees of Membership in States of Fuzzy Variables By way of example, a detailed explanation will be given below of the conversion of a principal variable, the excursion $eO_2$ of the oxygen level in the fumes at the outlet of the furnace, which is measured by the sensor 31, from a target value, in order to establish its degree of membership in one or more states of an associated fuzzy variable, referred to as $eO_2'$. This conversion procedure is applied similarly to all the other variables, both principal and secondary, to be taken into account for the application, according to fuzzy logic, of preestablished rules detailed below.

Figure 2:
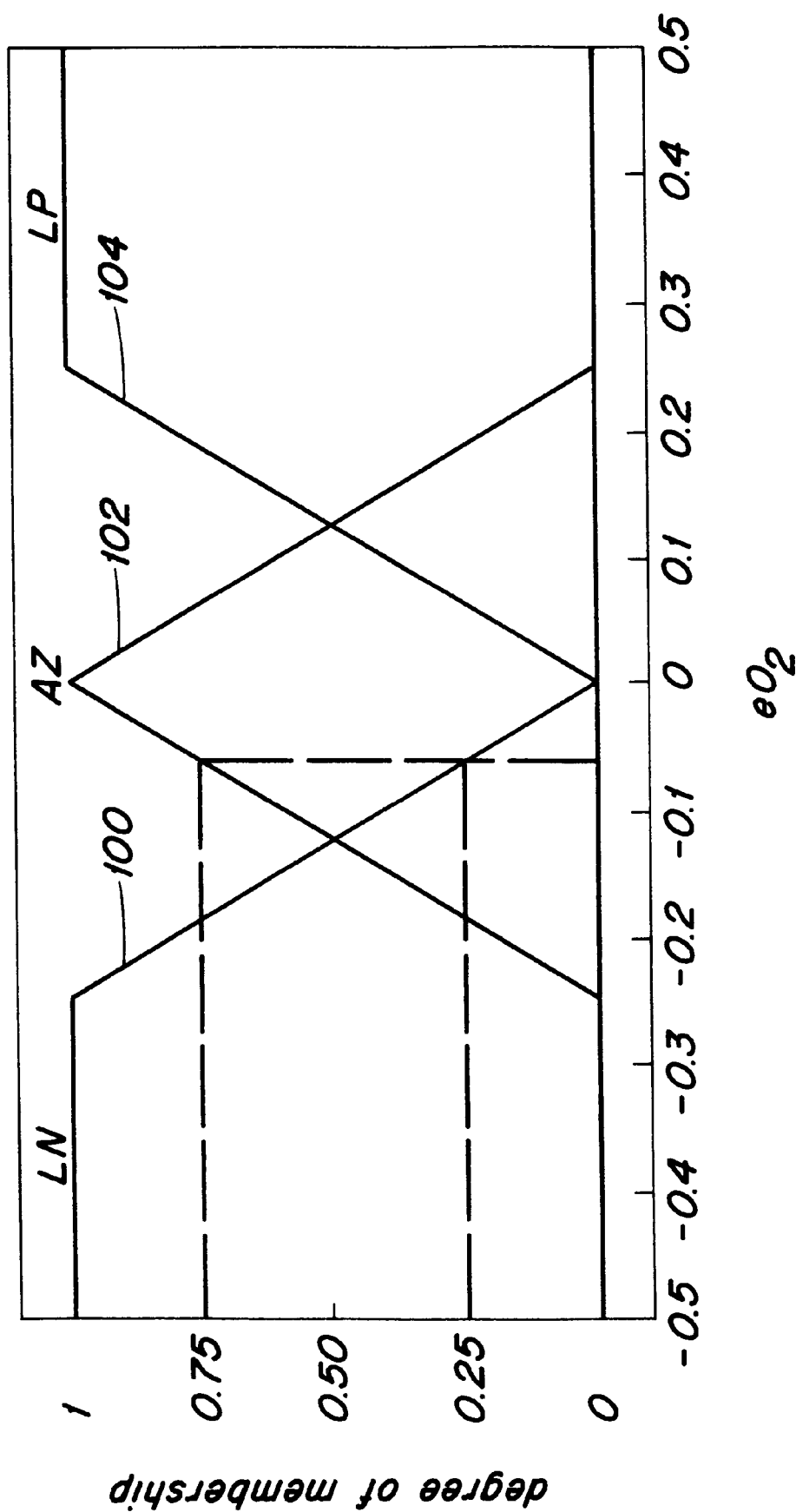
FIG. 2 shows a graph for illustrating the conversion of a principal variable with a view to establishing its degree of membership in one or more states of an associated fuzzy variable.

FIG. 2 represents a graph showing, on the abscissa, the universal set of $eO_2$ and, on the ordinate, the state membership values of the associated fuzzy variable $eO_2'$.

As can be seen in the figure, the fuzzy variable $eO_2'$ can assume three states, namely the states referred to as "LN" (=large negative), "AZ" (=approximately zero) and "LP" (=large positive).

Associated with each state of $eO_2'$ is a continuous curve 100, 102 and 104 making it possible to establish the degree of membership of a value of $eO_2$ in one or more states of the fuzzy variable $eO_2'$.

Thus, for example, curve 100 is associated with the state "LN" and has the shape of a plateau followed by a negative slope. Curve 102 is associated with the state "AZ" and has a triangular shape, and curved 104 is associated with the state "LP" and has a positive slope followed by a plateau.

The shape of curves 100, 102 and 104 is defined empirically from tests on furnaces. It will be noted that the plateaus at the ends of the universal set of the physical variables are generally adopted.

In addition, the ordinate values of curves 100, 102 and 104 lie between zero (0) and (1).

Furthermore, it is important to note that the various curves 100, 102 and 104 overlap so that one value of $eO_2$ can belong to different states of $eO_2'$.

Thus, for example, the value $eO_2=-0.06$ belongs to a state "LN" of the fuzzy variable $eO_2'$ with a degree of membership 0.25, and a state "AZ" of the fuzzy variable $eO_2'$ with a degree of membership 0.75.

This is also represented in FIG. 2.

The other variables are converted by the conversion means 55 according to the same principle.

II.2 Application of Rules According to Fuzzy Logic

The degrees of membership of the respective states of the fuzzy variables are input into means 56 for applying rules stored in the memory 65 forming a knowledge base. These rules are defined empirically on the basis of tests on furnaces.

Each rule involves at least two different fuzzy variables, of which at least one first is associated with a principal variable and of which at least one second is associated with a secondary variable.

The application of the rules makes it possible to obtain a regulating control instruction referred to as "dn" to be applied to the flow meters 21 and 23 in order to regulate the furnace 1.

"dn" represents a variation of the stoichiometric factor (also referred to as equivalence ratio) between the fuel and the oxidant, which needs to be applied to the regulation of the flow meters 21 and 23 in order to obtain optimized operation of the furnace. This variation "dn" of the stoichiometric factor can assume three states: "LN", "AZ" or "LP" corresponding respectively to a reduction, no change and an increase in the stoichiometric ratio.

By way of example, a simplified set of fourteen rules is indicated below for three fuzzy variables: the aforementioned fuzzy variable $eO_2'$ and the fuzzy variable $dO_2'$, which are respectively associated with principal variables, and the fuzzy variable NOx which is associated with a secondary variable.

The fuzzy variable $dO_2'$ is obtained from the variation per unit time "$dO_2$" of the oxygen level in the fumes at the outlet of the furnace. $dO_2'$ can also assume three states, namely the states referred to as "LN", "AZ" and "LP".

The fuzzy variable NOx can only assume two sates: "acceptable" or "unacceptable", depending on whether or not the level of nitrogen oxides in the fumes at the outlet of the furnace, which is measured by the sensor 32, crosses a certain threshold defined, for example, by a legal standard.

| No. | $eO_2'$ | $dO_2'$ | NOx | → | dn |
|-----|------|------|------|---|-----|
| 1 | LN | LP | acceptable | | AZ |
| 2 | AZ | LP | acceptable | | LP |
| 3 | LP | LP | acceptable | | LP |
| 4 | LN | AZ | acceptable | | LN |
| 5 | AZ | AZ | acceptable | | AZ |
| 6 | LP | AZ | acceptable | | LP |
| 7 | LN | LN | acceptable | | LN |
| 8 | AZ | LN | acceptable | | LN |
| 9 | LP | LN | acceptable | | AZ |
| 10 | LN | LN | unacceptable | | LN |
| 11 | AZ | AZ | unacceptable | | LN |
| 12 | AZ | LP | unacceptable | | AZ |
| 13 | LP | LP | unacceptable | | AZ |
| 14 | LP | AZ | unacceptable | | AZ |

Let us assume that $eO_2'$ belongs to:

state "LN" of the fuzzy variable $eO_2'$ with a degree membership 0.25, and a state "AZ" of the fuzzy variable eO$_2$' with a degree of membership 0.75, that dO$_2$' belongs to a state "AZ" of the fuzzy variable dO$_2$' with a degree of membership 0.25, and a state "LP" of the fuzzy variable dO$_2$' with a degree of membership 0.75, and that NOx belongs to the state "unacceptable".

The means 56 apply rules 1 to 14 in the following way in order to determine the control instruction to be applied to the flow meters 21 and 23 according to the fuzzy logic.

Firstly, the means 63 only consider the relevant rules, that is to say in the present example, rules No. 11 and 12.

Next, a "MIN-MAX" selection instruction is applied. This instruction consists in firstly assigning a degree of membership to a variation of the stoichiometric factor "LN", "AZ", or "LP" equal to the minimum of the degrees of membership of the states of the said fuzzy variables which are to be taken into consideration for this specific rule.

In the present example, applying for example rule No. 11, the result obtained is that dn should be in a state LN with a degree of membership equal to MIN (0.75; 0.25)=0.25.

Similarly, by applying the rule No. 12, the result obtained is that dn should be in a state AZ with a degree of membership equal to MIN (0.75; 0.75)=0.75.

As the final result of the degrees of membership of the respective states of the control instruction obtained according to fuzzy logic, the maximum membership obtained for each state is secondly considered, namely in the present example, 0.25 for state LN, 0.75 for state AZ and 0 state LP.

Next, for the control instruction, the one corresponding to the state which has obtained the maximum membership is applied, that is to say in the present case "AZ". This means that, for this regulating cycle, the fuzzy-logic controller will keep unchanged the stoichiometric factor between the fuel and the oxidant which are injected into the combustion chamber 3.

Of course, the set of rules and the variables which are taken into account in this set constitute only a simplified example. This process makes it possible to take into account, in the same way, a multitude of other variables such as, for example, the roof temperature and the variation in the roof temperature, as regards the principal variables, and the carbon monoxide level, the wall temperature of the furnace, the nitrogen level in the combustible and the oxygen level in the oxidant, as regards the secondary variables.

It will thus be understood that taking into account the secondary variables such as, for example, the level of nitrogen oxides in the fumes at the outlet of the furnace and, more particularly, using fuzzy logic, make it possible to refine considerably the regulation of oxy-combustion in a furnace and to respond better to the constraints and perturbations to which the operation of such a furnace is subjected.

What is claimed is:

1. A process for combustion of a fuel with an oxidant whose oxygen level is more than 25 mol %, in a combustion chamber, comprising the steps of:

measuring at least one principal variable representing the combustion in the said combustion chamber;

determining a regulating control instruction as a function of the result of the step of measuring the at least one principal variable, the regulating control instruction for regulating the flowrates of fuel and oxidant to be injected into the combustion chamber;

burning the fuel with the oxidant in accordance with the regulating control instruction in the chamber;

measuring at least one secondary variable associated with an operational constraint of the combustion chamber or with a perturbation in the operation of the combustion chamber;

wherein said step of determining a regulating control instruction further comprises determining a control instruction as a function of the result of the step of measuring the at least one secondary variable;

wherein said step of determining a regulating control instruction is performed by a fuzzy-logic controller employing the steps comprising:

determining the degree of membership of each principal or secondary variable in at least one state of a fuzzy variable; and applying at least one preestablished rule between at least one state of a first fuzzy variable and a state of a second fuzzy variable in order to determine the regulating control instruction.

2. A process according to claim 1, wherein the at least one secondary variable is a variable selected from the group consisting of the level of nitrogen oxides in the outlet fumes of the combustion chamber, the level of carbon monoxide in the outlet fumes of the combustion chamber, and a wall temperature of the combustion chamber.

3. A process according to claim 1, wherein the at least one principal variable is a variable selected from the group consisting of the nitrogen level of the fuel, the oxygen level of the oxidant, and the operational state of at least one burner of the combustion chamber.

4. A process according to claim 1, wherein the step of measuring at least one secondary variable comprises measuring a plurality of secondary variables associated with operational constraints of the combustion chamber, associated with perturbations in the operation of the combustion chamber, or both; and wherein the step of determining the regulating control instruction comprises determining as a function of the results of measuring the plurality of secondary variable.

5. A process according to claim 1, wherein the step of determining the degree of membership comprises determining the degree of membership based on curves defined throughout the universal set of the principal and secondary variables.

6. A process according to claim 2, wherein the at least one principal variable is a variable selected from the group consisting of the nitrogen level of the fuel, the oxygen level of the oxidant, and the operational state of at least one burner of the combustion chamber.

7. A process according to claim 2, wherein the step of measuring at least one secondary variable comprises measuring a plurality of secondary variables associated with operational constraints of the combustion chamber, associated with perturbations in the operation of the combustion chamber, or both; and wherein the step of determining the regulating control instruction comprises determining as a function of the results of measuring the plurality of secondary variable.

8. A process according to claim 3, wherein the step of measuring at least one secondary variable comprises measuring a plurality of secondary variables associated with operational constraints of the combustion chamber, associated with perturbations in the operation of the combustion chamber, or both; and wherein the step of determining the regulating control instruction comprises determining as a function of the results of measuring the plurality of secondary variable.

* * * * *